(12) United States Patent
Kang et al.

(10) Patent No.: US 11,431,900 B2
(45) Date of Patent: Aug. 30, 2022

(54) IMAGE DATA PROCESSING METHOD AND DEVICE THEREFOR

(71) Applicant: Samsung Electronics Co., Ltd., Gyeonggi-do (KR)

(72) Inventors: Wonseok Kang, Gyeonggi-do (KR); Wonbae Lim, Gyeonggi-do (KR); Sangwoo Park, Gyeonggi-do (KR); Eunkyu Lee, Gyeonggi-do (KR); Soohwan Chae, Gyeonggi-do (KR); Meeryung Choi, Gyeonggi-do (KR); Eujin Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/975,229

(22) PCT Filed: Mar. 20, 2019

(86) PCT No.: PCT/KR2019/003216
§ 371 (c)(1),
(2) Date: Aug. 24, 2020

(87) PCT Pub. No.: WO2019/182340
PCT Pub. Date: Sep. 26, 2019

(65) Prior Publication Data
US 2020/0404172 A1 Dec. 24, 2020

(30) Foreign Application Priority Data
Mar. 21, 2018 (KR) .......... 10-2018-0032831

(51) Int. Cl.
*H04N 5/232* (2006.01)
*H04N 5/76* (2006.01)
(Continued)

(52) U.S. Cl.
CPC ... *H04N 5/23229* (2013.01); *H04N 5/232933* (2018.08); *H04N 5/76* (2013.01)

(58) Field of Classification Search
CPC ......... H04N 5/23229; H04N 5/232933; H04N 5/23238; H04N 5/23216
See application file for complete search history.

(56) References Cited

U.S. PATENT DOCUMENTS

| 8,687,071 B2 | 4/2014 | Yamaji |
| 8,866,879 B2 | 10/2014 | Seen et al. |

(Continued)

FOREIGN PATENT DOCUMENTS

| CN | 102467341 A | 5/2012 |
| CN | 103109537 A | 5/2013 |

(Continued)

OTHER PUBLICATIONS

Chinese Search Report dated Sep. 29, 2021.
European Search Report dated Feb. 11, 2021.
Chinese Office Action dated May 7, 2022.

*Primary Examiner* — Christopher K Peterson
(74) *Attorney, Agent, or Firm* — Cha & Reiter, LLC

(57) ABSTRACT

Disclosed is an electronic device including an image obtaining device configured to obtain at least one pieces of image data, at least one sensor to sense movement of a user, a display, at least one processor electrically connected to the image obtaining device, the at least one sensor, and the display, and a memory electrically connected to the at least one processor to store instructions that when executed, cause the processor to obtain multiple pieces of first image data through the image obtaining device while obtaining data associated with a first movement of the user through the at least one sensor, obtain multiple pieces of second image data through the image obtaining device while obtaining data associated with a second movement of the user through the (Continued)

at least one sensor, process the multiple pieces of first image data through a first image processing scheme corresponding to the first movement and output a processing result through the display, and process the multiple pieces of second image data through a second image processing scheme corresponding to the second movement and different from the first image processing scheme, and output a processing result through the display. Moreover, various embodiment found through the present disclosure are possible.

14 Claims, 9 Drawing Sheets

(51) Int. Cl.
    *G06T 5/50*     (2006.01)
    *G06T 7/00*     (2017.01)
    *H04N 5/225*     (2006.01)

(56) References Cited

U.S. PATENT DOCUMENTS

| | | |
|---|---|---|
| 8,933,991 B2 | 1/2015 | Lim et al. |
| 9,609,209 B2 | 3/2017 | Lee et al. |
| 9,819,870 B2 | 11/2017 | Sohn et al. |
| 10,063,791 B2 | 8/2018 | Johansson |
| 10,659,684 B2 | 5/2020 | Lee et al. |
| 2005/0163218 A1 | 7/2005 | Le Clerc et al. |
| 2012/0026290 A1 | 2/2012 | Lim et al. |
| 2012/0113216 A1 | 5/2012 | Seen et al. |
| 2013/0155205 A1* | 6/2013 | Kosakai ............... H04N 13/211 348/50 |
| 2014/0226052 A1* | 8/2014 | Kang ............... H04N 5/232935 348/333.02 |
| 2015/0294474 A1 | 10/2015 | Grandin et al. |
| 2017/0237901 A1 | 8/2017 | Lee et al. |
| 2018/0063361 A1 | 3/2018 | Goo et al. |

FOREIGN PATENT DOCUMENTS

| | | |
|---|---|---|
| CN | 107087101 A | 8/2017 |
| CN | 107786794 A | 3/2018 |
| JP | 2010-193245 A | 9/2010 |
| JP | 2011-76372 A | 4/2011 |
| JP | 2016-12834 A | 1/2016 |
| KR | 10-2004-0068291 A | 7/2004 |
| KR | 10-2014-0147597 A | 12/2014 |
| KR | 10-2016-0026251 A | 3/2016 |
| KR | 10-2016-0122144 A | 10/2016 |
| KR | 10-2017-0096459 A | 8/2017 |

\* cited by examiner (1)

(2)

IMAGE DATA PROCESSING METHOD AND DEVICE THEREFOR

CROSS REFERENCE TO RELATED APPLICATIONS

This application is a National Phase Entry of PCT International Application No. PCT/KR2019/003216, which was filed on Mar. 20, 2019, and claims a priority to Korean Patent Application No. 10-2018-0032831, which was filed on Mar. 21, 2018, the contents of which are incorporated herein by reference.

TECHNICAL FIELD

Embodiments disclosed herein relate to techniques of processing image data.

BACKGROUND ART

Recently, image processing techniques support various shooting modes such that a user may express various situations, and process a photograph taken by receiving a selection from a user for a relevant shooting mode. When taking a photograph, the user may express a desired concept by setting various shooting modes (e.g., panorama, surround or wide selfie).

DISCLOSURE

Technical Problem

Conventionally, a user should set the intended shooting mode before taking a photograph. Accordingly, when the user fails to set a desired mode, a photograph should be inconveniently taken again to obtain a result. In addition, it is difficult to apply another shooting mode to image data obtained through shooting, so the user should take a photograph again to obtain the same image data.

Various embodiments disclosed herein suggest a method, in which a photograph is taken by considering movement of a user and then processed such that photographs reflect a user intent, and a device for the same.

Technical Solution

According to an embodiment disclosed herein, an electronic device including an image obtaining device configured to obtain at least one pieces of image data, at least one sensor to sense movement of a user, a display, at least one processor electrically connected to the image obtaining device, the at least one sensor, and the display, and a memory electrically connected to the at least one processor to store instructions.

The instructions may when executed, cause the processor to obtain multiple pieces of first image data through the image obtaining device while obtaining data associated with a first movement of the user through the at least one sensor, obtain multiple pieces of second image data through the image obtaining device while obtaining data associated with a second movement of the user through the at least one sensor, process the multiple pieces of first image data through a first image processing scheme corresponding to the first movement and output a processing result through the display, and process the multiple pieces of second image data through a second image processing scheme corresponding to the second movement and different from the first image processing scheme, and output a processing result through the display.

In addition, according to an embodiment disclosed herein, a method may include obtaining multiple pieces of image data, obtaining data associated with movement of a user through at least one sensor, determining a scheme for processing the multiple pieces of image data based on the data associated with the movement, and processing the multiple pieces of image data through the determined scheme for processing the multiple pieces of image data, and displaying, on a display, a processing result.

Advantageous Effects

According to embodiments disclosed herein, the electronic device may obtain the image processing result to be matched with the user intent, after obtaining the image.

According to embodiments disclosed herein, the electronic device may re-process the obtained image thereafter by reflecting the user intent.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1A:
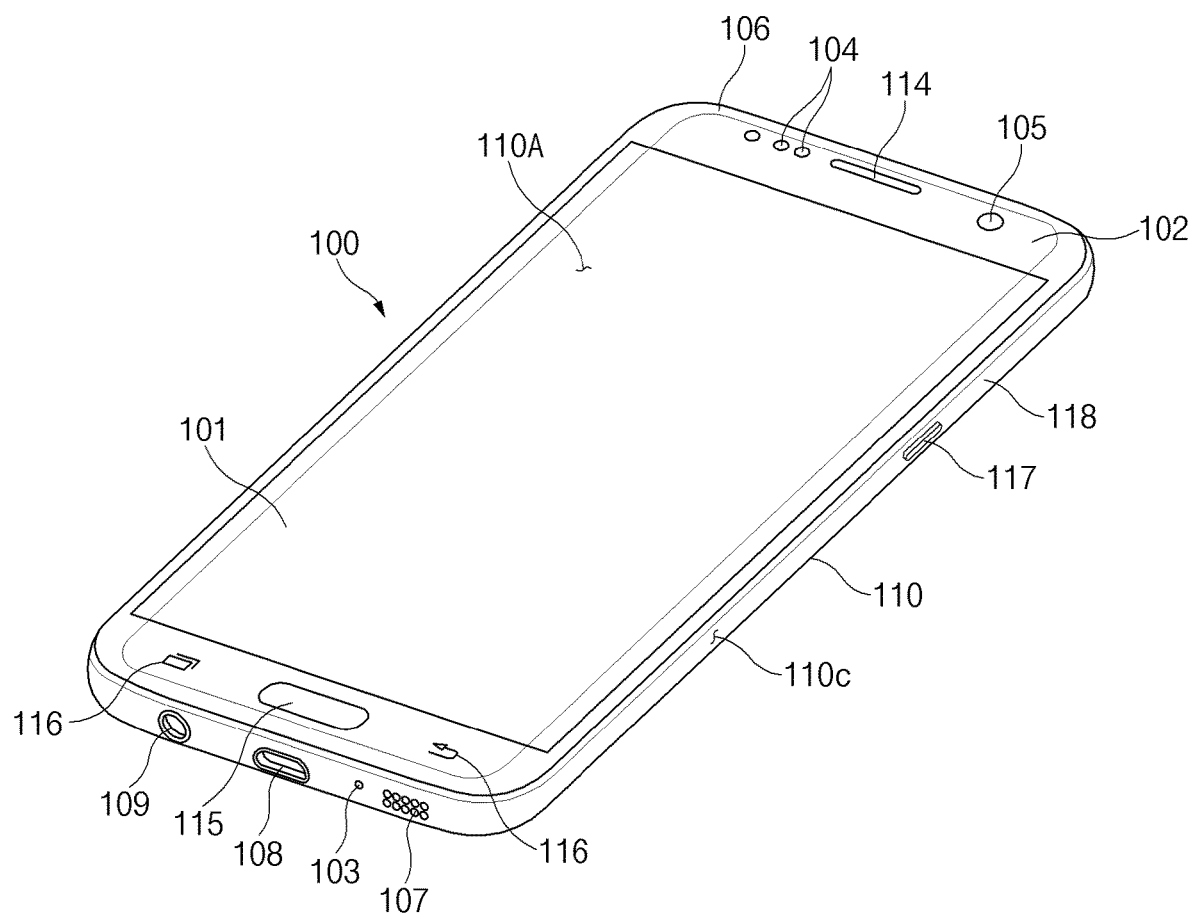
FIG. 1A is a perspective view illustrating a front surface of a mobile electronic device, according to an embodiment.

FIG. 1A is a perspective view illustrating a front surface of a mobile electronic device, according to an embodiment.

Figure 1B:
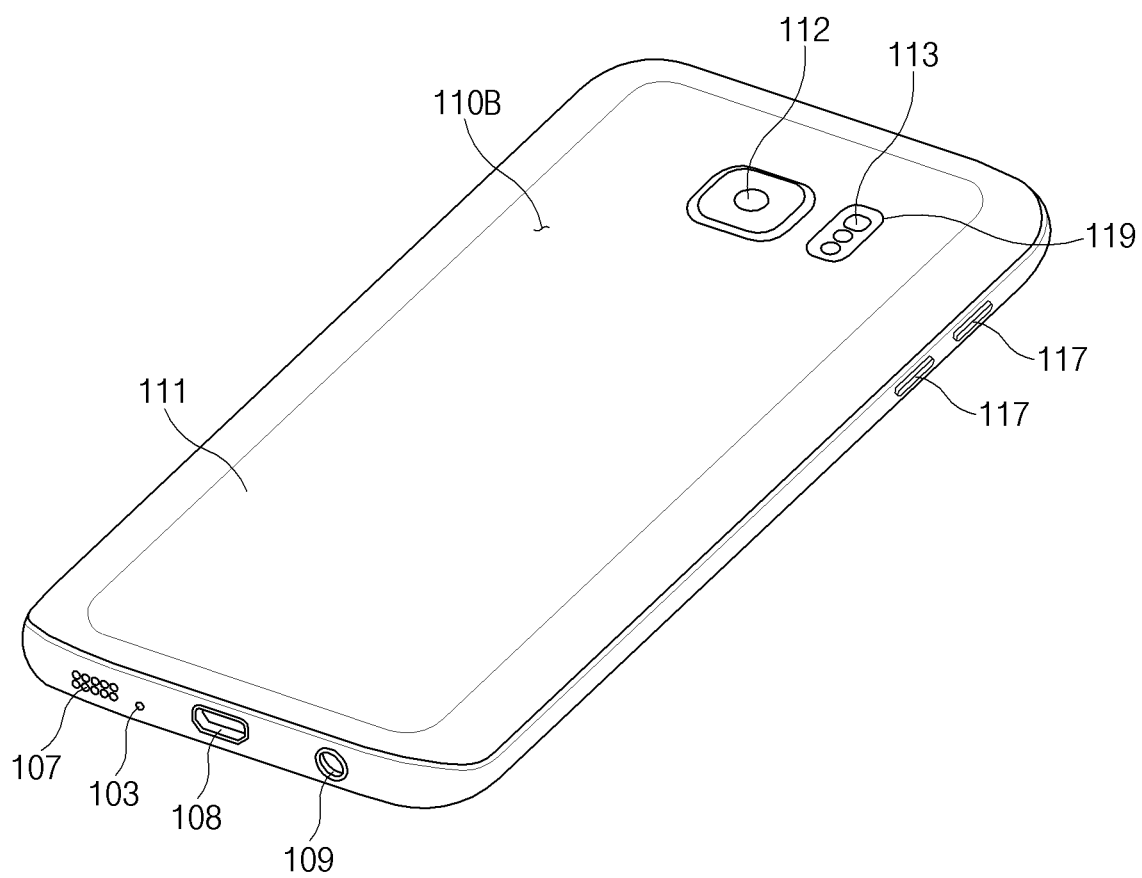
FIG. 1B is a perspective view illustrating a rear surface of an electronic device of FIG. 1A.

FIG. 1B is a perspective view illustrating a rear surface of an electronic device of FIG. 1A.

Referring to FIGS. 1A and 1B, according to an embodiment, an electronic device 100 may include a housing 110 including a first surface 110A (or front surface), a second surface 110B (or rear surface), and a side surface 110C surrounding the space between the first surface 110A and the second surface 110B. In another embodiment (not illustrated), a housing may be referred to as the structure forming some of the first surface 110A, the second surface 110B, and the side surface 110C of FIG. 1A. According to an embodiment, the first surface 110A may include a front plate 102 (e.g., a glass plate or a polymer plate including various coating layers) having at least a portion substantially transparent. The second surface 110B may be formed through a rear plate 111 substantially opaque. The rear plate 111 may include, for example, coating or colored glass, ceramic, polymer, metal (e.g., aluminum, stainless steel (STS), or magnesium) or the combination of at least two of the above materials. The side surface 110C may include a side bezel structure (or "side member") 118 which is coupled to the front plate 102 and the rear plate 111, and includes metal and/or polymer. In an embodiment, the rear plate 111 and the side bezel structure 118 may be formed integrally with each other and may include the same material (e.g., a metal material such as aluminum).

According to an embodiment, the electronic device 100 includes at least one of a display 101, audio modules 103, 107 and 114, sensor modules 104 and 119, camera modules 105, 112 and 113, key input devices 115, 116, and 117, an indicator 106, or connector holes 108 and 109. In an embodiment, the electronic device 100 may omit at least one (e.g., the key input device 115, 116, and 117, or the indicator 106) components or may additionally include other components.

The display 101 may be exposed, for example, through a substantial portion of the front plate 102. The display 101 may be coupled or disposed adjacent to a touch sensing circuit, a pressure sensor to measure the intensity (pressure) of a touch, and/or a digitizer to detect the stylus pen based on an electromagnetic scheme.

The audio modules 103, 107, and 114 may include the microphone hole 103 and the speaker holes 107 and 114. The microphone hole 103 may have a microphone disposed in the electronic device to obtain an external sound. In an embodiment, the microphone hole 103 may have a plurality of microphones disposed in the electronic device to sense the direction of a sound. The speaker holes 107 and 114 may include the external speaker hole 107 and the receiver hole 114 for conversation. In an embodiment, the speaker holes 107 and 114 and the microphone hole 103 may be implemented into one hole or a speaker may be included without the speaker holes 107 and 114 (e.g., a piezoelectric speaker).

In an embodiment, the sensor modules 104 and 119 may generate electrical signals or data values corresponding to an internal operating state or an external environment state of the electronic device 100. The sensor modules 104 and 119 may, for example, include the first sensor module 104 (e.g., a proximity sensor) and/or a second sensor module (e.g., a fingerprint sensor; not illustrated) disposed on the first surface 110A of the housing 110, and/or the third sensor module 119 (e.g., a HRM sensor) disposed on the second surface 110B of the housing 110. The fingerprint sensor may be disposed on the second surface 110B as well as the first surface 110A (e.g., the home key button 115) of the housing 110. The electronic device 100 may further include a sensor module (is not illustrated), for example, at least one of a gesture sensor, a gyro sensor, an air pressure sensor, a magnetic sensor, an acceleration sensor, a grip sensor, a color sensor, an infrared sensor, a biometric sensor, a temperature sensor, a humidity sensor, or the illuminance sensor 104.

The camera modules 105, 112 and 113 may include the first camera device 105 disposed on the first surface 110A of the electronic device 100 and the second camera device 112 and/or the flash 113 disposed on the second surface 110B. The camera modules 105 and 112 may include at least one lens, an image sensor, and/or an image signal processor. The flash 113 may include, for example, a light emitting diode or a xenon lamp. In an embodiment, at least two lenses (a wide angle lens, and a telephoto lens) and image sensors may be disposed on one surface of the electronic device 100.

The key input devices 115, 116, and 117 may include the home key button 115 disposed on the first surface 110A of the housing 110, the touch pad 116 disposed around the home key button 115, and/or the side key button 117 disposed on the side surface 110C of housing 110. In another embodiment, the electronic device 100 may not include some or an entire portion of the key input devices 115, 116, and 117, and the key input devices 115, 116, and 117 not included may be implemented in another form such as a soft key on the display 101.

The indicator 106 may be, for example, disposed on the first surface 110A of the housing 110. The indicator 106 may provide, in the form of light, the state information of the electronic device 100, and may include a light emitting diode (LED).

The connector holes 108 and 109 may include the first connector hole 108 to receive a connector (e.g., a USB connector) to transmit and receive power and/or data together with the external electronic device and/or the second connector hole (e.g., an ear-phone jack) 109 to receive a connector to transmit or receive an audio signal together with the external electronic.

Figure 2:
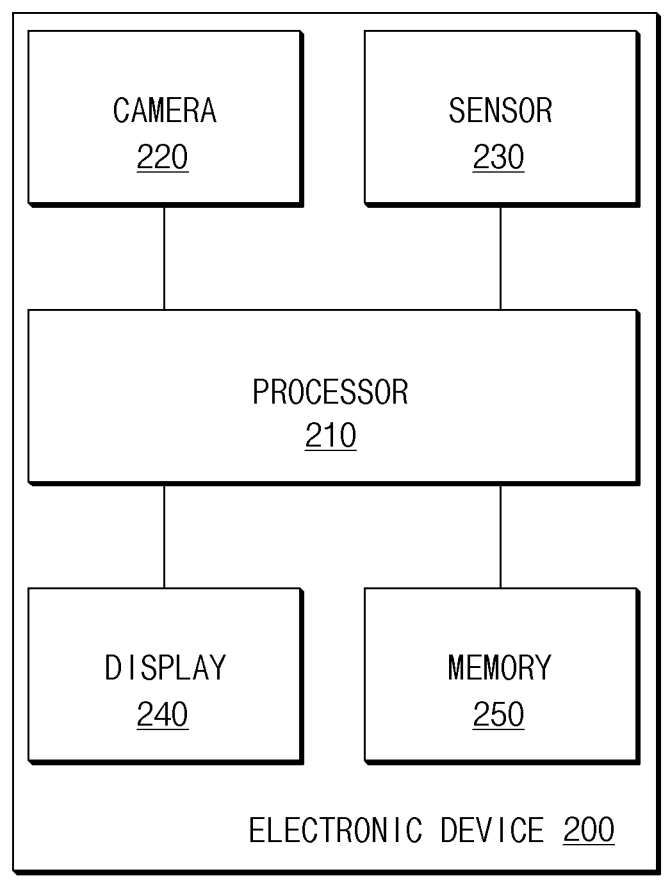
FIG. 2 is a block diagram illustrating a configuration of an electronic device, according to an embodiment.

FIG. 2 is a block diagram illustrating a configuration of an electronic device, according to an embodiment.

Referring to FIG. 2, an electronic device 200 (e.g., the electronic device 100 of FIG. 1A or 1B) may include at least one of a processor 210, a camera 220, a sensor 230, a display 240, or a memory 250. The electronic device 200 may include components inside the housing (e.g., the housing 110 of FIG. 1). The components of the electronic device 200 may be modified to execute various embodiments disclosed therein. For example, some components of the electronic device 200 may be omitted, or the electronic device 200 may further include an additional input device or a communication circuit to obtain image data.

According to one embodiment, the processor 210 may perform (or execute) various operations described herein or may control other components (e.g., the camera 220 or the display 240) for the various operations. According to an embodiment, the processor 210 may execute instructions stored in the memory 250. The processor 210 may, for example, include an application processor (AP) or an image signal processor.

According to an embodiment, at least one camera 220 (e.g., the camera modules 105, 112, and 113 of FIG. 1) may be included. The electronic device may obtain various image data (e.g., a photograph or an image) through the camera 220. Although FIG. 2 illustrates that the camera 220 is disposed inside the electronic device 200, but the camera 220 may be an external component of the electronic device 200. In this case, the electronic device 200 may obtain the image data through the communication circuit in a wired manner or a wireless manner. According to an embodiment, the camera 220 may be electrically connected to the processor 210.

According to an embodiment, the at least one sensor 230 may obtain data associated with the movement of the user and/or position data of the user. The electronic device may obtain data associated with the movement and/or the position data using the sensor 230. The data associated with the movement may be referred to as motion data. According to an embodiment, the at least one sensor 230 may include a sensor, such as an acceleration sensor or a geomagnetic sensor, to obtain the data associated with the movement of the user. According to an embodiment, the sensor 230 may further include at least one of a touch sensor or a pressure sensor. The electronic device may sense a user input through the touch sensor and/or the pressure sensor. The sensor 230 may be electrically connected to the processor 210. For example, the electronic device may obtain a long press input or a pressure input through the touch sensor and/or the pressure sensor.

According to an embodiment, the display 240 may display the obtained image or display the processing result of the image data. In addition, the electronic device 200 may output an application (or a screen associated with the application) through the display 240. According to an embodiment, the display 240 may function as an input device. For example, the display 240 may be implemented as a touch screen display including a touch panel, and the electronic device may obtain a user input through a touch sensor included in the touch panel. According to an embodiment, the display 240 may further include a pressure panel. The electronic device may obtain a user input through a pressure sensor included in the pressure panel. The electronic device 200 may obtain a user input through an input device separate from the display 240 or may obtain a user input through an input device outside the housing of the electronic device 200. The display 240 may be electrically connected to the processor 210.

According to an embodiment, the memory 250 may store instructions for performing (or executing) various embodiments disclosed herein. In addition, the memory 250 may store an application (e.g., an application associated with a camera or an application associated with storing a photograph). Data obtained by the camera 220 and/or the sensor 230 may be stored in the memory 250. The processor 210 may execute the instructions or may read out data from the memory 250.

Figure 3A:
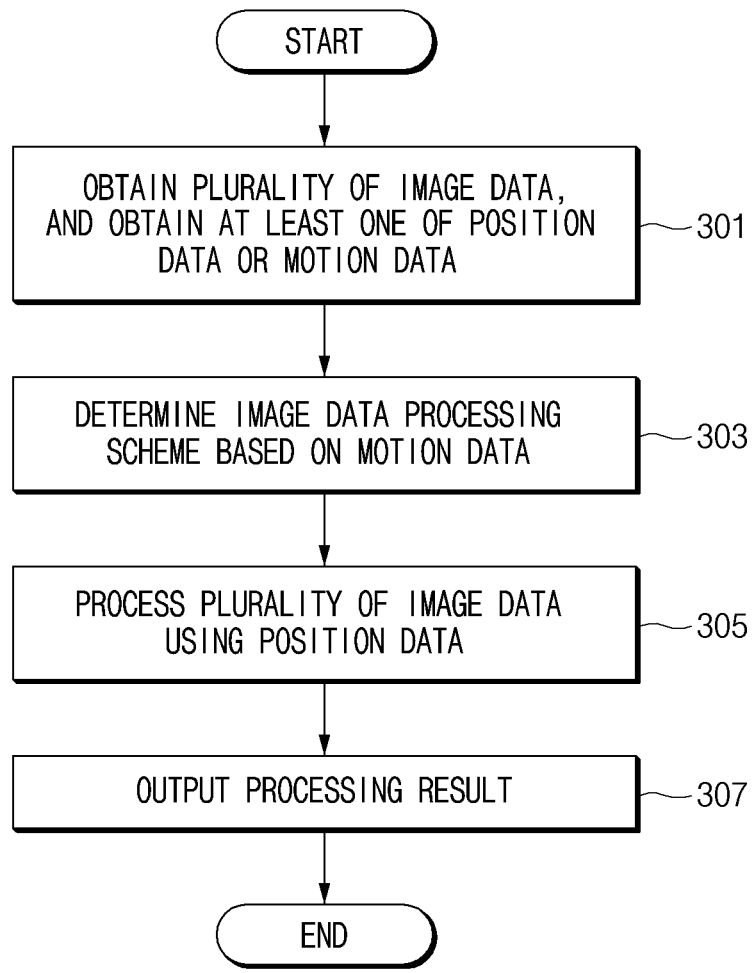
FIGS. 3A and 3B are flowcharts illustrating image processing operations of an electronic device, according to an embodiment.
Figure 3B:
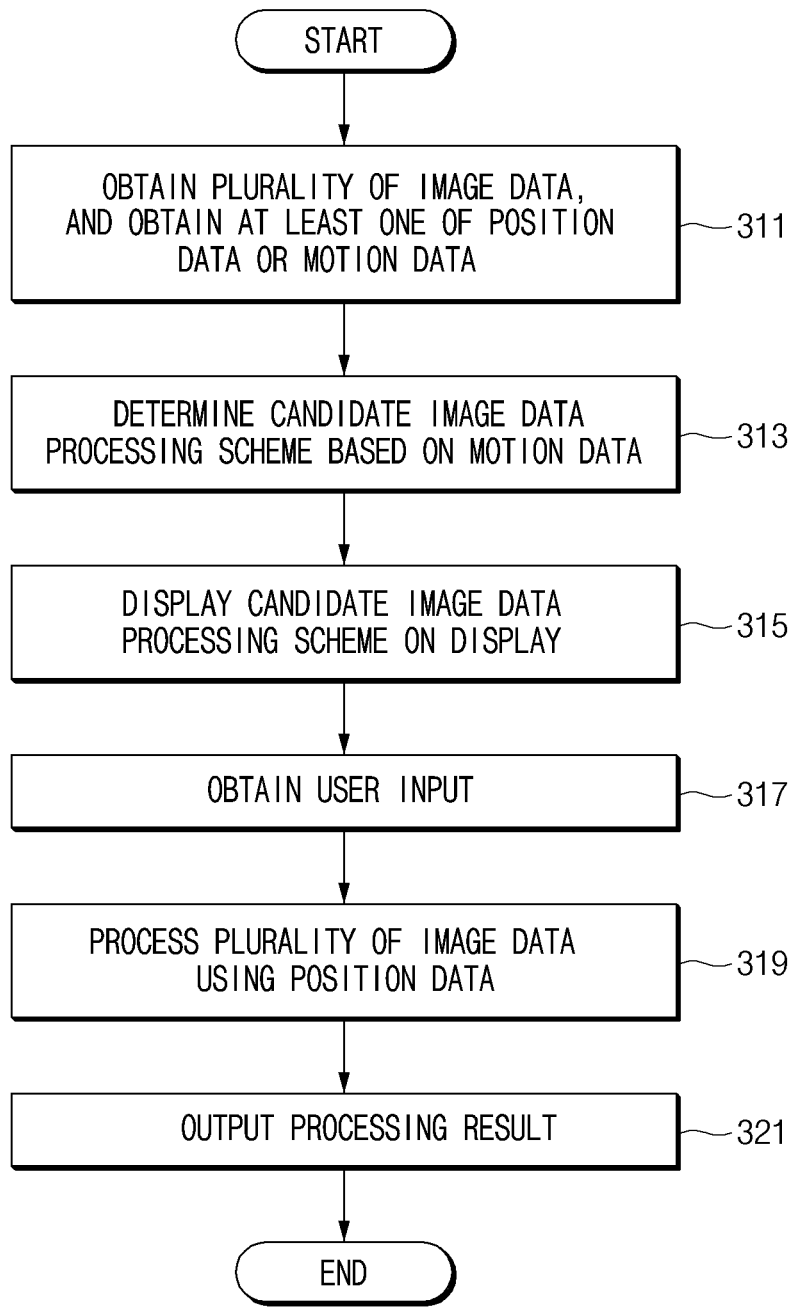

FIGS. 3A and 3B are flowchart illustrating image processing operations of an electronic device, according to an embodiment.

According to an embodiment, the electronic device (e.g., the electronic device 100 of FIG. 1A or FIG. 1B or the electronic device 200 of FIG. 2) may process the obtained image data based on the image data, and at least one of the position data or the motion data of the user. For example, the electronic device may determine an image data processing scheme based at least on the motion data of the user. Operations disclosed in the following description may be stored in the form of instructions in the memory and may be executed by the processor.

FIG. 3A illustrates operations that an electronic device determines an image data processing scheme based at least on motion data, and processes the image data through the determined image data processing scheme, according to an embodiment and FIG. 3B illustrates operations that an electronic device determines an image data processing scheme based at least on motion data and uses the relevant image data processing scheme through the confirmation of a user.

Referring to FIG. 3A, in operation 301, the electronic device may obtain multiple pieces of image data and may obtain at least one of position data or motion data. For example, the electronic device may obtain the multiple pieces of image data for a first time duration, and may obtain the position data and/or motion data through the sensor for the first time duration. In other words, the electronic device may obtain the position data and/or motion data while obtaining the multiple pieces of image data.

According to an embodiment, the electronic device may obtain the position data through a sensor. For example, the electronic device may obtain the position data using an acceleration sensor and/or a geomagnetic sensor. The electronic device may obtain raw data using the acceleration sensor and/or the geomagnetic sensor, and store the raw data in the memory. The raw data may include the position data. The raw data may be expressed in a (x, y, z) coordinate format.

According to an embodiment, the electronic device may obtain reference data associated with a user motion in advance. For example, the electronic device may obtain, in advance, reference data on a circle, a sphere, and/or X, Y, and Z axis movements to be stored in the memory.

According to an embodiment, the electronic device may obtain the motion (or motion data) of the user by comparing the obtained data with the reference data.

The electronic device may store data, which is obtained while executing the camera or an application associated with the camera, in the memory. For example, the electronic device may first store the obtained raw data in a RAM area of the memory.

When obtaining data similar to the reference data (or representing a similar movement) after storing the data, which is obtained while executing the application, in the RAM area of the memory, the electronic device may store the relevant data in a flash memory. When the storing is performed by classifying the memory as described above, the electronic device may reduce that the storage space of the memory is inefficiently used.

In operation 303, the electronic device may determine the image data processing scheme for processing the multiple pieces of image data based on the motion data. According to an embodiment, the electronic device may obtain the motion data and may determine the image data processing scheme depending on the motion of the user recognized based on the motion data.

According to an embodiment, the electronic device may obtain a first motion of the user while obtaining multiple pieces of first image data. The electronic device may determine a first image data processing scheme based on the first motion. Alternatively, the electronic device may obtain a second motion of the user while obtaining multiple pieces of second image data. The electronic device may determine a second image data processing scheme based on the second motion. For example, when the first motion is a motion of moving the electronic device on a straight line within a specified range, the first image data processing scheme may correspond to a panorama processing scheme. When the second motion is a motion of moving the electronic device in a circular or spherical shape, the second image data processing scheme may correspond to a surround processing scheme.

In operation 305, the electronic device may process the multiple pieces of image data using the position data. In other words, when processing the multiple pieces of image data, the electronic device may process the multiple pieces of image data, based on the position data as well as the multiple pieces of image data.

For example, the electronic device may determine the size of the multiple pieces of image data which are synthesized, based on the position data, or may determine a synthesizing sequence or a synthesizing point (or consecutive point) of the multiple pieces of the image data, based on the position data.

According to an embodiment, the electronic device may process a plurality of images through the image processing scheme, which is determined based on the motion data, and the position data. The electronic device may determine the image processing scheme, and process the multiple pieces of image data through the determined image processing scheme by using the position data.

According to an embodiment, the electronic device may process the multiple pieces of image data based on the continuity of the multiple pieces of image data. The electronic device may synthesize the multiple pieces of image data by comparing the motion data with the continuity between $n^{th}$ image data and $n-1^{th}$ image data.

According to an embodiment, the electronic device may identify the continuity between multiple pieces of image data using various schemes. According to an embodiment, the electronic device may obtain depth data using a component to identify the depth data, may identify the continuity between the multiple pieces of image data based on the depth data, and may synthesize the multiple pieces of image data. For example, the electronic device may synthesize the multiple pieces of image data based on the depth data, color continuity between obtained image data, and/or the movement of an object. The component to identify the depth data may include, for example, at least two cameras or sensors.

According to an embodiment, the electronic device may synthesize the multiple pieces of image data based on the likelihood of an object or the similar pattern to that of the object. The electronic device may synthesize an image based on the likelihood of the object or the similar pattern to that of the object, and position data of the object. For example, the electronic device may analyze the movement of the object based on the likelihood of the object or the similar pattern to that of the object, and synthesize a plurality of images by synthesizing the position data obtained through the sensor.

According to an embodiment, the electronic device may differently set a scheme of identifying the image continuity based on the included component. For example, when the electronic device includes a hardware component to obtain the depth data, the electronic device may synthesize multiple pieces of image data using the depth data, and when the electronic device does not include the hardware component, the electronic device may synthesize the multiple pieces of image data based on the likelihood of the object or the similar pattern to that of the object.

In operation 307, the electronic device may output an image data processing result. The electronic device may output the image data processing result through the display. The electronic device may store processing results in the memory in response to generating multiple pieces of image data processing results.

According to an embodiment, the electronic device may provide a UI for editing the image data processing result or a UI for processing multiple pieces of image data through a differ scheme. To this end, the electronic device may store the multiple pieces of image data and then process the image data.

Referring to FIG. 3B, in operation 311, the electronic device may obtain multiple pieces of image data, and at least one of position data or motion data. The multiple pieces of image data may be data obtained in response to a specific input. For example, the specific input may be a long press input or a pressure input. Operation 311 may be the same as or similar to operation 301 of FIG. 3A.

In operation 313, the electronic device may determine a candidate image data processing scheme based on at least the motion data. Operation 313 may be the same as or similar to operation 303 of FIG. 3A. The candidate image data processing scheme may be at least one of panorama, surround or wide selfie. The image data processing scheme, which is determined, is used after the confirmation of the user. Accordingly, the image data processing scheme is named the candidate image data processing scheme, but used with the same meaning as or the similar meaning to the image data processing scheme determined in operation 303.

In operation 315, the electronic device may display the candidate image data processing scheme on the display. The electronic device may display the candidate image data processing scheme as a guide provided to the user.

In operation 317, the electronic device may obtain a user input through the display. The user input may be a user input associated with the candidate image data processing scheme. The user input may be, for example, a touch input. The candidate image data processing scheme may be determined as a processing scheme of the multiple pieces of image data depending on the user input.

In operation 319, in response to the user input, the electronic device may process the multiple pieces of image data using the position data. The electronic device may process the multiple pieces of image data through the image data processing scheme determined in operation 313.

In operation 321, the electronic device may output the processing result of the multiple pieces of image data. Operation 321 may be the same as or similar to operation 307 of FIG. 3A.

Figure 4:
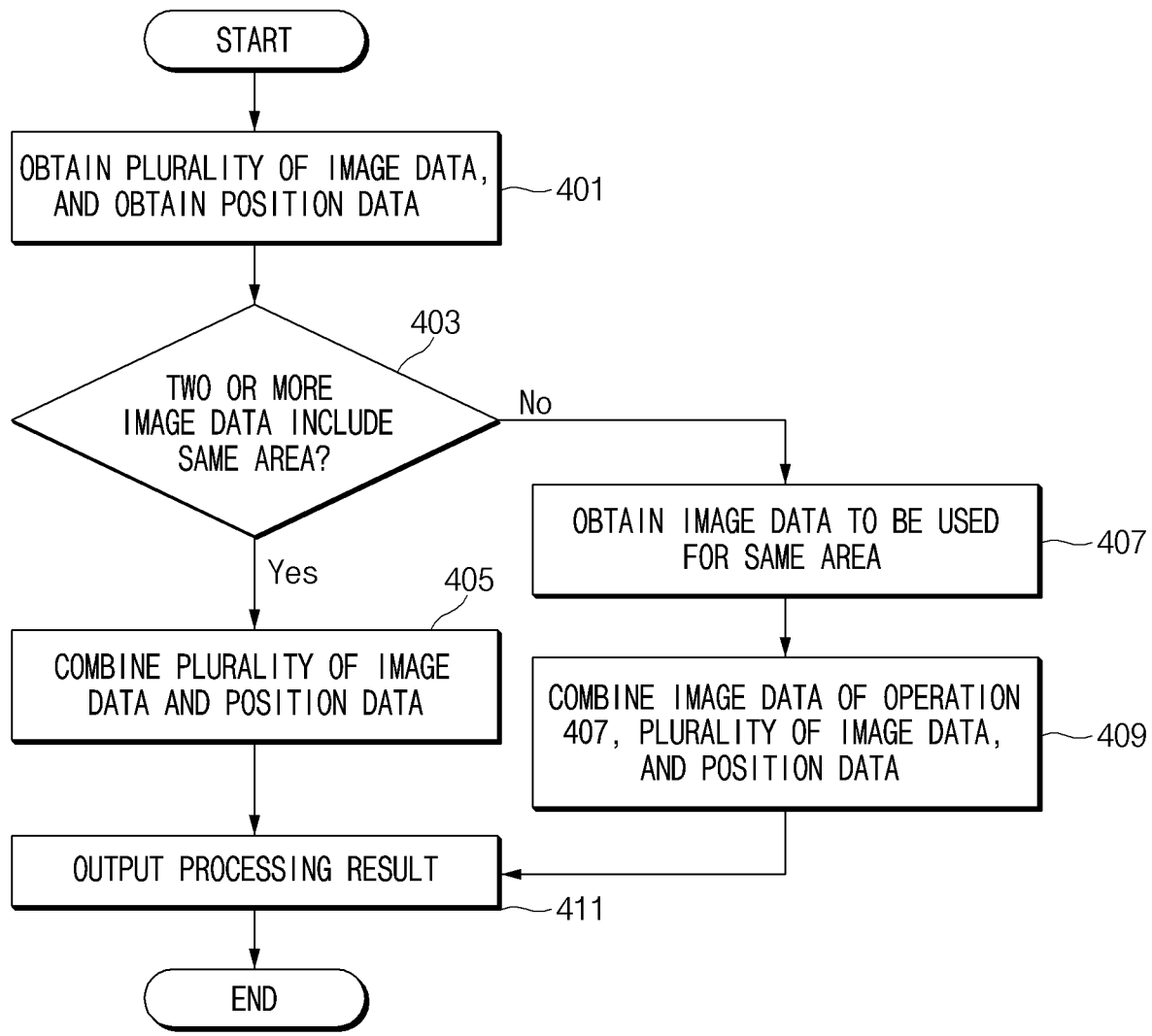
FIG. 4 is a flowchart illustrating an image processing operation of an electronic device, according to an embodiment.

FIG. 4 is a flowchart illustrating an image processing operation of an electronic device, according to an embodiment.

According to an embodiment, the electronic device (e.g., the electronic device 100 of FIG. 1A or 1B or the electronic device 200 of FIG. 2) may determine whether image data including the same area is present in multiple pieces of photographed image data, and may process the multiple pieces of image data depending on the processing result. Operations disclosed in the following description may be stored in the form of instructions in the memory and may be executed by the processor.

In operation 401, the electronic device may obtain multiple pieces of image data, and obtain position data. For example, the electronic device may obtain the multiple pieces of image data for a first time duration, and may obtain the position data through the sensor for the first time duration. In other words, the electronic device may obtain the position data associated with the image data while obtaining the image data.

In operation 403, the electronic device may determine whether the at least two pieces of image data include the same area. The electronic device may determine whether multiple pieces of image data or some of the multiple pieces of image data include the same area. The electronic device may perform operation 405 when the multiple pieces of image data fail to include the same area, and perform operation 407 when the multiple pieces of image data include the same area. When the multiple pieces of image data are combined and when a duplicated area is present, operation 407 may be performed to obtain image data to be used for the relevant area.

According to an embodiment, when the multiple pieces of image data or some of the multiple pieces of image data merely include the same area, or when the same area is included in one image data in a specific proportion or more, the electronic device may determine the same area as being included.

In operation 405, the electronic device may combine the multiple pieces of image data and the position data. For example, the electronic device may generate an image data processing result by synthesizing the multiple pieces of image data and the position data when processing the multiple pieces of image data. Operation 405 may be the same as or similar to operation 305 of FIG. 3A.

In operation 407, the electronic device may obtain image data to be used for the same area. The electronic device may obtain image data of one of images including the same area.

According to an embodiment, the electronic device may directly select one piece of image data or obtain the one piece of the image data through a user selection.

According to an embodiment, the electronic device may determine that there are present several pieces of data obtained by photographing the same area, and select the best shot from the several pieces of data obtained by photographing the same area. The best shot may be, for example, image data that is sharper than other image data and suitable for a peripheral portion.

According to an embodiment, the electronic device may display, on the display, at least two pieces of image data, which include the same area, to be selected by the user. The electronic device may obtain a user input for one of the at least two pieces of image data. In this case, the electronic device may display only data corresponding to the same area on the display.

In operation 409, the electronic device may combine the image data obtained in operation 407, the multiple pieces of image data, and the position data. The electronic device may process the multiple pieces of image data by using the position data and one pieces of image data, which is obtained from image data including the same area (or duplicated area), and may generate an image data processing result.

According to an embodiment, the electronic device may match the motion of the user with image data, based on position data obtained from the motion of the user. The electronic device may obtain or detect an area in which a user's motion is duplicated and/or an area duplicated in image data.

On the assumption that the multiple pieces of image data include first image data, second image data, and third image data, and the first image data and the second image data include the same area, operations 405 and 409 will be described below by way of example. In this case, it is assumed that a first area of the first image data and a second area of the second image data include the same object.

The electronic device may synthesize the first image data to the third image data, but may use one of the first area or the second area in relation to the same area. For example, when the first area is selected in relation to the same area, the first image data or the first area may be used when synthesizing image data. The electronic device may synthesize at least a portion of the first image data (the first area and the remaining area except for the first area), at least a portion of the remaining area of the second image data except for the second area, and the third image data.

According to an embodiment, when processing the duplicated image, the electronic device may process the duplicated image with priority. According to an embodiment, an image obtained first may have priority over an image obtained later.

According to an embodiment, when the duplicated images are obtained, the electronic device may provide a guide through the display to obtain a selection for an image to be used for synthesizing. The electronic device may output a screen, which includes the guide including the duplicated image, to the display. The electronic device may obtain a selection from a user through the display, and may synthesize a plurality of images by using the duplicated area, which corresponds to the selection from the user, of the image. The electronic device may not use a duplicated area of another image which is not selected.

The electronic device may synthesize the image data based on position data when synthesizing the image data. For example, the electronic device may determine the size of the multiple pieces of image data which are synthesized, based on the position data, or may determine a synthesizing sequence or a synthesizing point (or consecutive point) of the plurality of the image data based on the position data.

The electronic device may compare the multiple pieces of image data with each other in the continuity and may perform synthesizing. According to an embodiment, the electronic device may identify the continuity between image data through various schemes.

According to an embodiment, the electronic device may obtain depth data using a component to identify depth data, may identify the continuity between the multiple pieces of image data based on the depth data, and may synthesize the multiple pieces of image data. For example, the electronic device may identify the continuity between the multiple pieces of image data based on the depth data, continuous color between obtained image data, and/or the movement of an object. The depth data may be obtained using, for example, at least two cameras or sensors.

According to an embodiment, the electronic device may identify the continuity between the multiple pieces of image data based on the likelihood of the object or the similar pattern to that of the object. The electronic device may synthesize an image based on the likelihood of the object or the similar pattern to that of the object, and position data of the object.

According to an embodiment, the electronic device may differently set a scheme of identifying image continuity based on a hardware component. For example, when the electronic device includes a hardware component to obtain the depth data, the electronic device may obtain the continuity between multiple pieces of image data using the depth data, and when the electronic device does not include the hardware component, the electronic device may obtain the continuity between the multiple pieces of image data based on the likelihood of the object or the similar pattern to that of the object.

In operation 411, the electronic device may output the image data processing result. The electronic device may output the image data processing result on the display. The electronic device may display a UI for allowing a user to edit the processing result or to process the multiple pieces of image data through different schemes, in addition to the outputting of the image data processing result on the display.

According to various embodiments disclosed herein, the operations illustrated in FIG. 4 may be variously modified. For example, the electronic device may further obtain motion data, and may perform operation 303 of FIG. 3A. In this case, operation 303 may be performed at various points of time. For example, operation 303 may be performed between operation 403 and operation 401, between operation 407 and operation 409, or between operation 403 and operation 405.

Figure 5:
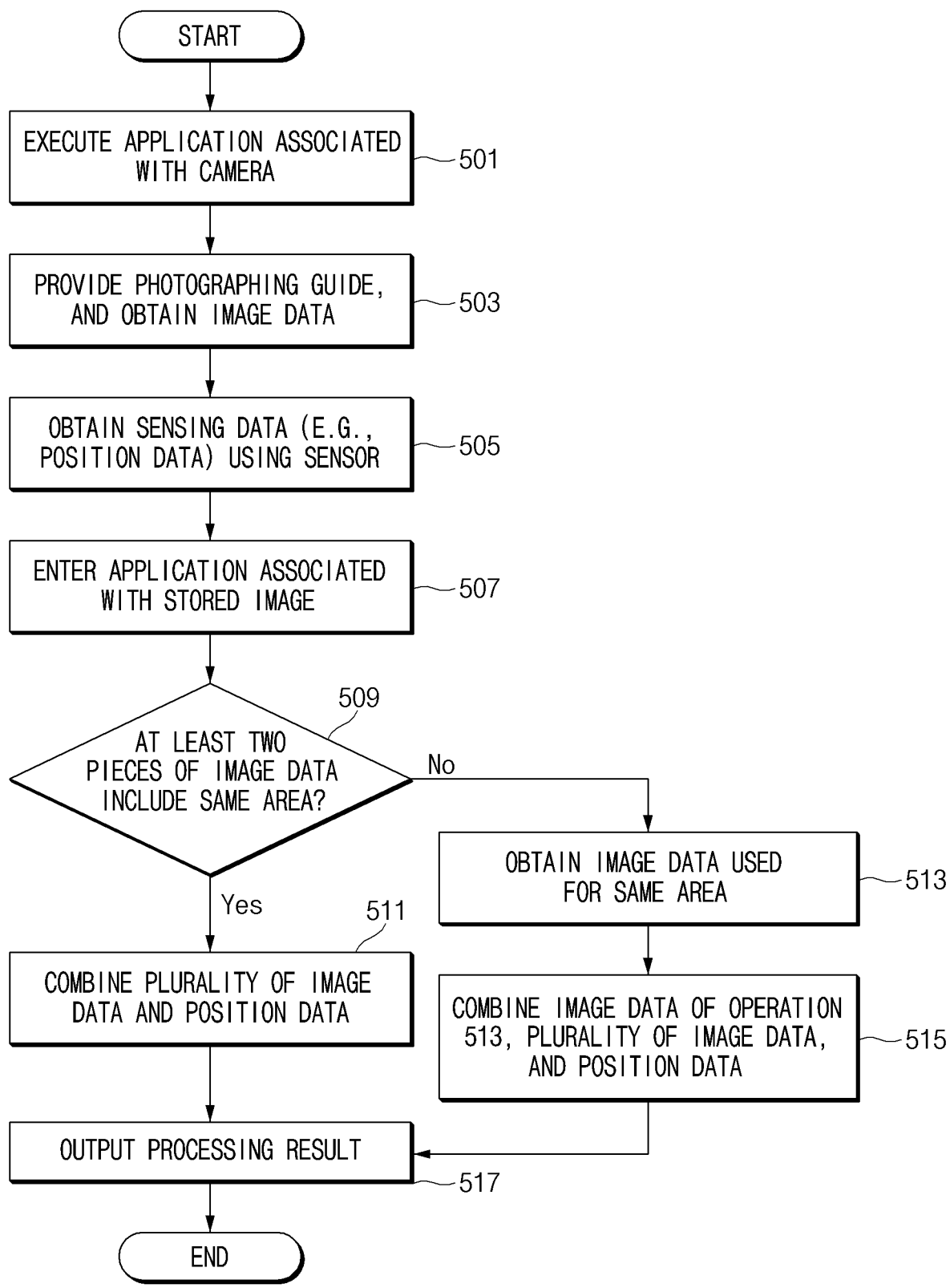
FIG. 5 is a flowchart illustrating an operation of an electronic device when a user executes an application, according to an embodiment.

FIG. 5 is a flowchart illustrating an operation of an electronic device when a user executes an application, according to an embodiment.

According to an embodiment, the electronic device (e.g., the electronic device 100 of FIG. 1A or FIG. 1B or the electronic device 200 of FIG. 2) may process the obtained image data based on image data and at least one of position data or motion data of the user. Operations disclosed in the following description may be stored in the form of instructions in the memory and may be executed by the processor.

In operation 501, the electronic device may execute an application associated with the camera. The electronic device may execute the application associated with the camera, in response to a user input.

In operation 503, the electronic device may provide a photographing guide through a display and obtain image data. The electronic device may provide the photographing guide on an execution screen of an application associated with the camera. The electronic device may obtain multiple pieces of image data in response to a user input through the application or for a time duration in which the user input is continuously made. The user input may be, for example, a long press input or a pressure input. The electronic device may obtain the long press input or the pressure input through a touch panel and/or a force touch panel. For example, the electronic device may generate a specific pressure or more to trigger image photographing, and may obtain multiple pieces of image data while the pressure is maintained. The electronic device may store the obtained image data in a memory (e.g., the memory 250 of FIG. 2).

According to an embodiment, the photographing guide may be selectively displayed on the display. For example, the electronic device may set whether to display the photographing guide depending on the selection from the user.

In operation 505, the electronic device may obtain sensing data using a sensor. The sensing data may include, for example, position data. The sensing data may further include motion data.

In operation 507, the electronic device may enter an application associated with the stored image. For example, the application may be a gallery application. In the following operation, the electronic device may process the obtained image data. In other words, the electronic device may perform image processing using the stored image.

Operation 509, operation 511, operation 513, operation 515 and/or operation 517 may be the same as or similar to operation 403, operation 405, operation 407, operation 409 and/or operation 411 of FIG. 4, respectively. To avoid the duplication of the description, the description of operations 509 to 517 will be omitted and may be understood by making reference to the description of FIG. 4.

Figure 6:
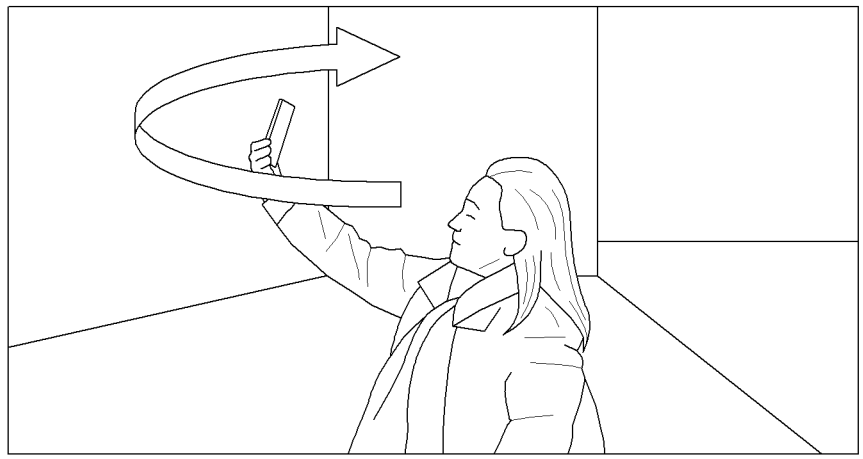
FIG. 6 is a view illustrating a situation that an electronic device operates, according to an embodiment.
Figure 6:
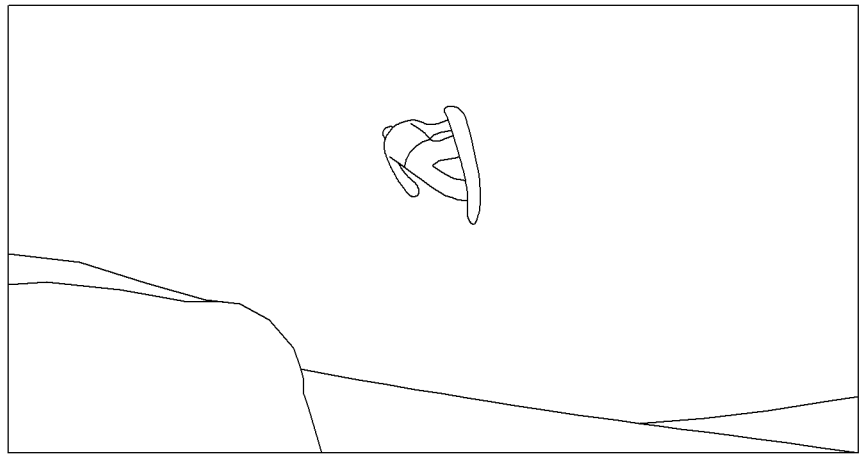

FIG. 6 is a view illustrating a situation that an electronic device operates, according to an embodiment.

Referring to reference numerals (1) and (2) of FIG. 6, the electronic device may obtain multiple pieces of image data and process the image data in a situation that the user moves statically or dynamically.

Referring to reference numerals (1) and (2) of FIG. 6, a user may execute an application associated with a camera and photograph an object through a specific input while the application is executed. The specific input may be an input set to correspond to obtaining the multiple pieces of image data, which is similar to a log press.

The electronic device may obtain multiple pieces of image data, motion data and/or position data in response to the user input, and process the multiple pieces of image data using the motion data and/or position data. For example, when a user takes a photograph while moving the electronic device from one point to another point, the electronic device may process image data to output a panorama shot in response to the movement.

According to an embodiment, an electronic device may include an image obtaining device configured to obtain at least one pieces of image data, at least one sensor to sense movement of a user, a display, at least one processor electrically connected to the image obtaining device, the at least one sensor, and the display, and a memory electrically connected to the at least one processor to store instructions.

The instructions, when executed, cause the processor to obtain multiple pieces of first image data through the image obtaining device while obtaining data associated with a first movement of the user through the at least one sensor, obtain multiple pieces of second image data through the image obtaining device while obtaining data associated with a second movement of the user through the at least one sensor, process the multiple pieces of first image data through a first image processing scheme corresponding to the first movement and output a processing result through the display, and process the multiple pieces of second image data through a second image processing scheme corresponding to the second movement and different from the first image processing scheme, and output a processing result through the display.

According to an embodiment, the instructions may cause, when executed, the processor to obtain position data while obtaining the data associated with the first movement through the sensor, and generate the multiple pieces of first image data based on the position data.

According to an embodiment, the instructions may cause, when executed, the processor to synthesize the multiple pieces of first image data through the first image processing scheme, when the first movement is sensed.

According to an embodiment, the multiple pieces of first image data may include first image data including a first area and second image data including a second area including an object identical to an object of the first area, and the instructions may cause, when executed, the processor to process the multiple pieces of first image data using one of the first area and the second area.

According to an embodiment, the instructions may cause, when executed, the processor to allow the memory to store the at least one pieces of image data.

According to an embodiment, the instructions may cause, when executed, the processor to allow the memory to store a processing result of the at least one pieces of image data.

According to an embodiment, the multiple pieces of first image data may include third image data and fourth image data, and the multiple pieces of first image data may be processed based on continuity between the third image data and the fourth image data.

According to an embodiment, the image obtaining device may include a camera.

According to an embodiment, the instructions may cause, when executed, the processor to obtain the multiple pieces of first image data and the multiple pieces of second image data in response to a user input while an application associated with the camera is running on the display.

According to an embodiment, the user input may correspond to a long press input through the display.

According to an embodiment, the instructions may cause, when executed, the processor to obtain the first movement while the long press input is obtained.

According to an embodiment, a method performed in an electronic device may include obtaining multiple pieces of image data, obtaining data associated with movement of a user through at least one sensor, determining a scheme for processing the multiple pieces of image data based on the data associated with the movement, and processing the multiple pieces of image data through the determined scheme for processing the multiple pieces of image data, and displaying, on a display, a processing result.

According to an embodiment, the method may further include obtaining position data associated with the multiple pieces of image data, and processing the multiple pieces of image data based on the position data.

According to an embodiment, the method may include determining whether at least two pieces of image data of the multiple pieces of image data include the same object, and obtaining one piece of image data of the at least two pieces of image data, when the at least two pieces of image data include the same object.

According to an embodiment, the method may further include processing the multiple pieces of image data using data associated with the same object included in the one piece of image data.

Figure 7:
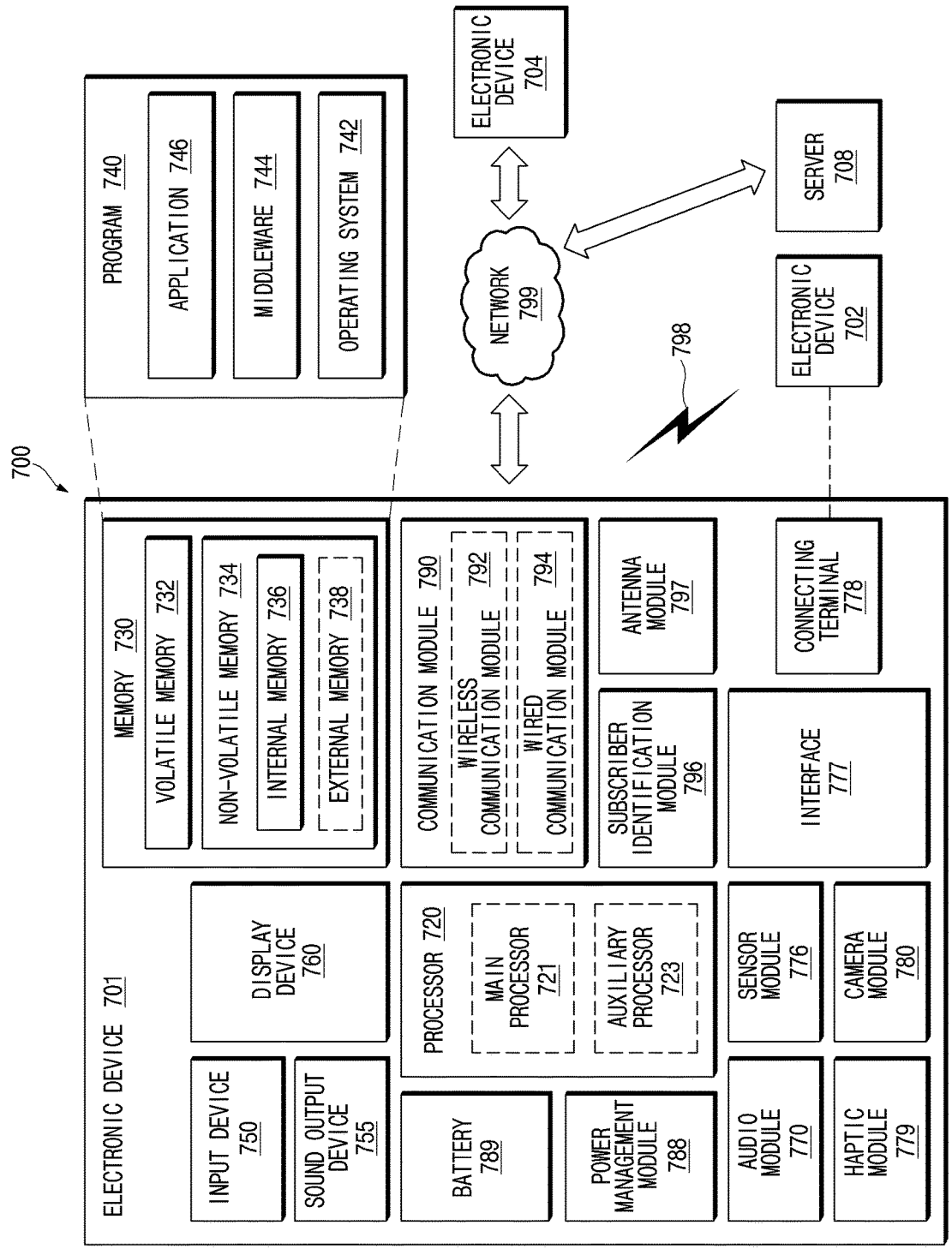
FIG. 7 is a block diagram of an electronic device in a network environment according to various embodiments.

FIG. 7 is a block diagram of an electronic device in a network environment according to various embodiments. Referring to FIG. 7, an electronic device 701 (e.g., the electronic device 100 of FIG. 2) may communicate with an electronic device 702 through a first network 798 (e.g., a short-range wireless communication) or may communicate with an electronic device 704 or a server 708 through a second network 799 (e.g., a long-distance wireless communication) in a network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 (e.g., the electronic device 100 of FIG. 2) may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 (e.g., the display 240 of FIG. 2) may be a device for visually presenting information to the user of the electronic device 701 and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 (e.g., the sensor 230 of FIG. 2) may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 (e.g., the camera 210 of FIG. 2) may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication module) and may communicate with the external electronic device using a corresponding communication module among them through the first network 798 (e.g., the short-range communication network such as a Bluetooth, a WiFi direct, or an infrared data association (IrDA)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the present disclosure to the particular forms disclosed herein; rather, the present disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 740) including an instruction stored in a machine-readable storage media (e.g., an internal memory 736 or an external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:
1. An electronic device comprising:
a camera;
at least one sensor;
a display;
at least one processor electrically connected to the camera, the at least one sensor, and the display; and
a memory electrically connected to the at least one processor to store instructions,
wherein the instructions, when executed, cause the at least one processor to:

obtain multiple pieces of image data through the camera while obtaining data associated with a movement of the electronic device through the at least one sensor;
when the multiple pieces of image data are obtained through the camera while obtaining first data associated with a first movement of moving the electronic device in a first type through the at least one sensor, process the multiple pieces of image data according to a first image processing scheme; and
when the multiple pieces of image data are obtained through the camera while obtaining second data associated with a second movement of moving the electronic device in a second type different from the first type through the at least one sensor, process the multiple pieces of image data according to a second image processing scheme; and
output the processed multiple pieces of the images to the display,
wherein the first image processing scheme comprises one of a panorama processing scheme, a surround processing scheme or a wide selfie processing scheme, and
wherein the second image processing scheme comprises another one of the panorama processing scheme, the surround processing scheme or the wide selfie processing scheme.

2. The electronic device of claim 1, wherein the instructions, when executed, cause the at least one processor to:
obtain position data while obtaining the data associated with the first movement through the at least one sensor; and
generate the multiple pieces of image data based on the position data.

3. The electronic device of claim 1, wherein the instructions, when executed, cause the at least one processor to:
synthesize the multiple pieces of image data through the first image processing scheme, when the first data associated with the first movement of the electronic device is obtained.

4. The electronic device of claim 1, wherein the multiple pieces of image data include first image data including a first area and second image data including a second area including an object identical to an object of the first area, and
wherein the instructions, when executed, cause the at least one processor to:
process the multiple pieces of image data using one of the first area and the second area.

5. The electronic device of claim 1, wherein the instructions, when executed, cause the at least one processor to:
allow the memory to store the at least one pieces of image data.

6. The electronic device of claim 5, wherein the instructions, when executed, cause the at least one processor to:
allow the memory to store a processing result of the at least one pieces of image data.

7. The electronic device of claim 1, wherein the multiple pieces of image data include third image data and fourth image data, and
wherein the multiple pieces of image data are processed based on continuity between the third image data and the fourth image data.

8. The electronic device of claim 1, wherein the instructions, when executed, cause the at least one processor to:
obtain the multiple pieces of image data in response to a user input while an application associated with the camera is running on the display.

9. The electronic device of claim 8, wherein the user input corresponds to a long press input through the display.

10. The electronic device of claim 9, wherein the instructions, when executed, cause the at least one processor to:
obtain the data associated with the movement of the electronic device while the long press input is obtained.

11. A method performed in an electronic device, the method comprising:
obtaining multiple pieces of image data;
obtaining data associated with a movement of the electronic device through at least one sensor;
when the multiple pieces of image data are obtained through a camera while obtaining first data associated with a first movement of the electronic device through the at least one sensor, processing the multiple pieces of image data according to a first image processing scheme;
when the multiple pieces of the image data are obtained through the camera while obtaining second data associated with a second movement of the electronic device through the at least one sensor, processing the multiple pieces of image data according to a second image processing scheme; and
outputting the processed multiple pieces of the images to a display,
wherein the first image processing scheme comprises one of a panorama processing scheme, a surround processing scheme or a wide selfie processing scheme, and
wherein the second image processing scheme comprises another one of the panorama processing scheme, the surround processing scheme or the wide selfie processing scheme.

12. The method of claim 11, further comprising:
obtaining position data associated with the multiple pieces of the image data; and
processing the multiple pieces of the image data based on the position data.

13. The method of claim 11, further comprising:
determining whether at least two pieces of the image data of the multiple pieces of the image data include a same object; and
obtaining one piece of the image data of the at least two pieces of the image data, when the at least two pieces of the image data include a same object.

14. The method of claim 13, further comprising:
processing the multiple pieces of the image data using data associated with the same object included in the one piece of the image data.

* * * * *